United States Patent [19]

Kato

[11] Patent Number: 4,478,898
[45] Date of Patent: Oct. 23, 1984

[54] LAMINATED POROUS POLYTETRAFLUOROETHYLENE TUBE AND ITS PROCESS OF MANUFACTURE

[75] Inventor: Hiroshi Kato, Tokorozawa, Japan

[73] Assignee: Junkosha Co., Ltd., Tokyo, Japan

[21] Appl. No.: 384,875

[22] Filed: Jun. 4, 1982

[51] Int. Cl.³ .......................... F16L 9/16; B32B 27/32; B29D 7/24; B29D 27/00
[52] U.S. Cl. ........................................ 428/36; 156/79; 156/184; 264/41; 264/45.3; 264/127; 264/288.8; 264/DIG. 66; 428/422
[58] Field of Search ........... 264/127, 41, 49, DIG. 66, 264/288.8, 45.3; 156/194, 309.6, 53, 184

[56] References Cited

U.S. PATENT DOCUMENTS

| | | | |
|---|---|---|---|
| 2,398,876 | 4/1946 | Bailey | 156/194 |
| 2,941,911 | 6/1960 | Kumnick et al. | 264/127 X |
| 2,964,065 | 12/1960 | Haroldson et al. | 156/309.6 X |
| 3,023,787 | 3/1962 | Phillips et al. | 156/194 X |
| 3,189,052 | 6/1965 | Devaney | 156/184 X |
| 3,205,289 | 9/1965 | Carpenter | 264/DIG. 66 |
| 3,219,738 | 11/1965 | Olson | 156/194 X |
| 3,348,991 | 10/1967 | Abell et al. | 264/127 X |
| 3,431,160 | 3/1969 | Usui et al. | 264/127 X |
| 3,501,360 | 3/1970 | Mancel | 264/127 X |
| 3,664,915 | 5/1972 | Gore | 264/127 X |
| 3,706,624 | 12/1972 | Rinker | 156/194 X |
| 3,953,566 | 4/1976 | Gore | 264/288 |
| 4,110,392 | 8/1978 | Yamazaki | 264/127 |
| 4,234,535 | 11/1980 | Okita | 264/288.8 X |
| 4,347,204 | 8/1982 | Takagi et al. | 264/127 |
| 4,443,511 | 4/1984 | Worden et al. | 264/288.8 X |

FOREIGN PATENT DOCUMENTS

| | | | |
|---|---|---|---|
| 2409178 | 8/1974 | Fed. Rep. of Germany | 264/127 |
| 48-33274 | 10/1973 | Japan | 156/309.6 |

Primary Examiner—Philip Anderson
Attorney, Agent, or Firm—Mortenson & Uebler

[57] ABSTRACT

A method of manufacturing a porous tetrafluoroethylene tube comprises forming a sheet of tetrafluoroethylene containing a lubricant, winding it into a tubular shape, wrapping reinforcing material about the tubular shape to form a tubular product, rolling the tubular product so that it may have a uniform wall thickness, preheating the tubular product at a temperature lower than 327° C., stretching the tubular product longitudinally, and heating it at a temperature higher than 327° C., while holding it in its stretched position. The method may also be used to manufacture a tube containing 15 to 95% by weight of a filler.

9 Claims, 7 Drawing Figures

LAMINATED POROUS POLYTETRAFLUOROETHYLENE TUBE AND ITS PROCESS OF MANUFACTURE

BACKGROUND OF THE INVENTION

1. Field of the Invention

This invention relates to a method of manufacturing a porous polytetrafluoroethylene (PTFE) tube. The tube may optionally contain a filler.

2. Description of the Prior Art

A porous PTFE tube is usually manufactured by a method which comprises extruding a tubular PTFE product, stretching it longitudinally into a tube several times its original length to make it porous, heating the tube to a temperature higher than the melting point of PTFE, while it is held in its stretched length. Such a tube which has high longitudinal strength can be produced by the method described in U.S. Pat. No. 3,953,566. The ability of this tube to resist internal pressure is, in certain cases, unsatisfactory. It is difficult to manufacture a porous PTFE tube having a thin wall or a small diameter by this method.

SUMMARY OF THE INVENTION

It is an object of this invention to provide a method which eliminates the aforesaid drawbacks of the prior art, and enables the manufacture of a porous PTFE tube having a small wall thickness and/or a small diameter.

It is another object of this invention to provide a method of manufacturing a porous PTFE tube of the laminated construction. It is also an object of this invention to economically provide a porous PTFE tube containing a large quantity of filler and having a small thickness and diameter.

According to this invention, there is, thus, provided a method of manufacturing a porous PTFE tube, optionally containing a large quantity of filler which comprises molding a sheet of PTFE containing lubricant such as White Oil, Naphtha, Esters and silicone oil, winding it into a tubular product, applying reinforcing material about the tubular product, rolling the reinforced tubular product so that it may have a uniform wall thickness, heating it at a temperature lower than 327° C., stretching it longitudinally, and heating the stretched product at a temperature higher than 327° while it is held in its stretched position.

According to another aspect of this invention, there is provided a method of manufacturing a porous PTFE tube, optionally containing a large quantity of filler, of the laminated construction by, for example, laminating a plurality of sheets of a fluorocarbon resin such as hexafluoropropylene having different directions of orientation, laminating a plurality of sheets of PTFE having different physical properties, or disposing an additional member between laminated sheets of PTFE.

Other objects, features and advantages of this invention will become apparent from the following detailed description.

DETAILED DESCRIPTION OF THE INVENTION

Figure 1:
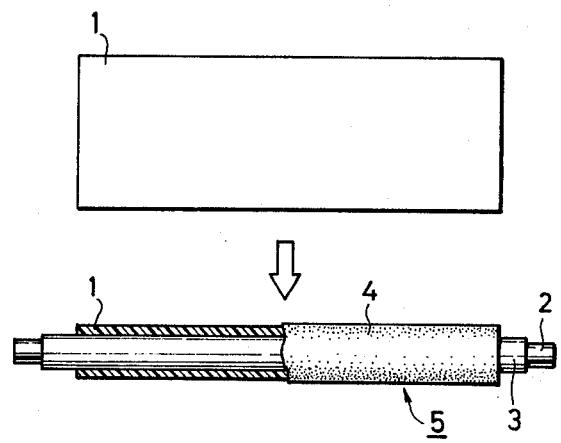
FIG. 1 is a view showing schematically the formation of a tubular product from a sheet of PTFE.
Figure 2:
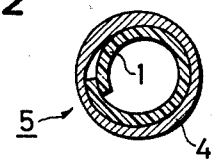
FIG. 2 is a cross sectional view of the tubular product shown in FIG. 1.

The invention will now be described in further detail by way of example and with reference to the drawings. A paste of PTFE containing a lubricant for imparting wear resistance is extrusion molded, and the extruded product is reduced in thickness by rolling to form a sheet 1, of PTFE. The sheet 1 is wound about a thermally shrinkable tube 3 of PTFE provided about a roll 2, and reinforcing material 4 is applied about the sheet 1, whereby a tubular PTFE product 5 is formed, as shown in FIG. 1. The tubular product 5 has a cross section which is shown in FIG. 2. It has a greater wall thickness where the longitudinal edges of the sheet 1 overlap each other, than in any other portion thereof.

Figure 3:
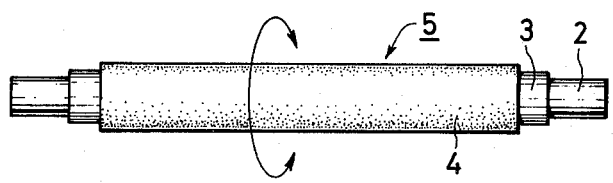
FIG. 3 is a top plan view of the tubular product which is being rolled.
Figure 4:
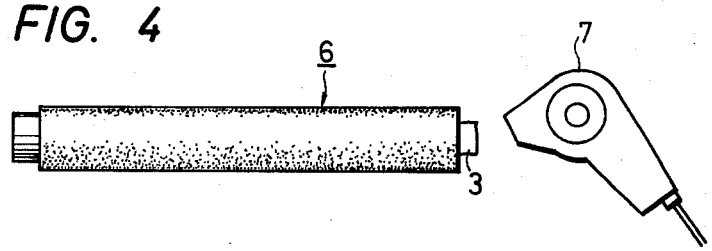
FIG. 4 is a top plan view of the tubular product from which a thermally shrinkable tube is being removed.
Figure 5:
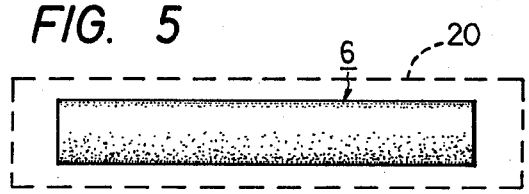
FIG. 5 is a top plan view of the tubular product thus having a uniform wall thickness being heated in an oven.
Figure 6:
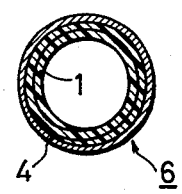
FIG. 6 is an end view of the tubular product shown in FIG. 5.

The tubular product 5 is rolled, for example, between a pair of flat plates not shown, while it still surrounds the tube 3 and the roll 2 as shown in FIG. 3, so that it may have a uniform wall thickness. The roll 2 is removed from the tubular product 6 of uniform wall thickness. The tubular product 6 is placed in an oven not shown, or a hot air blower 7 is employed as shown in FIG. 4 to supply hot air into the tubular product 6, whereby the thermally shrinkable tube 3 is caused to shrink, and is removed, as shown in FIG. 5. The tubular product 6 has a uniform wall thickness as shown in FIG. 6.

The tubular product 6, of FIG. 5, is mounted in a stretching machine not shown, and has its opposite ends clamped therein. It is preheated at a temperature lower than 327° C., preferably at a temperature of 200° C. to 300° C., in conventional oven 20, shown in phantom whereby the lubricant is removed. Then, it is stretched into a tube having, for example, about twice its original length, and made porous. The tube may usually have a stretch ratio of 1.4 to 15. If it has a stretch ratio of 1.4, it may have a porosity of about 40%, while a stretch ratio of 15 provides a porosity of about 95%. If PTFE containing a filler is used, the tube may have a porosity of at least 80% if it is stretched to a length which is several times as large. Then, the tube is held in its stretched position, and heated at a temperature higher than 327° C., for example, at 350° C., for about 20 minutes, so that its shrinkage or deformation may be prevented. The tube is allowed to cool.

Figure 7:
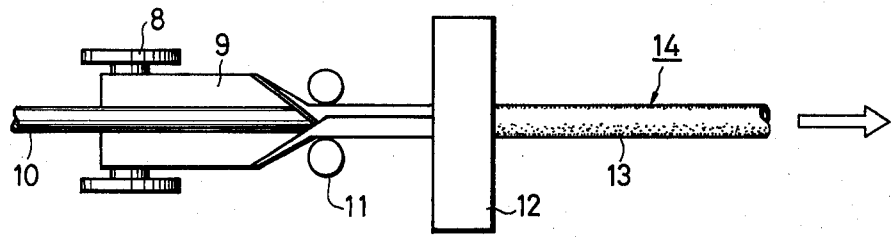
FIG. 7 is a top plan view of an apparatus which may be used for manufacturing any such tubular product continuously.

Referring now to FIG. 7, there is shown a modified method of this invention which is adapted to manufacture a tube continuously. A sheet 9 of PTFE, which is supplied from a drum 8, is wound about a core 10 comprising a roll about which a releasing agent, or a thermally shrinkable tube of PTFE is applied, while the sheet 9 has its longitudinal edges extending along the core 10, and guided by a pair of guide rollers 11. The tubularly formed sheet 9 is introduced into a wrapping machine 12 in which reinforcing material 13 is wrapped about the tubularly formed sheet 9 to form an elongated tubular product 14. The tubular product 14 is wound about a drum not shown, or the like.

The sheet 9 may be obtained by extrusion of PTFE, and rolling of the extruded product for reducing its thickness. If the sheet 9 has its molecules oriented in a direction equal to that in which it is wound on the drum 8, it advantageously has a satisfactory orientation, and hence, a satisfactorily high degree of strength. The strength of the sheet 9 can be further improved if it is formed by lamination of a plurality of sheets of PTFE having different directions of orientation. Tubular products having different desirable properties can be obtained by lamination of a plurality of sheets having different physical properties attained by incorporation of different types of fillers, or if another active member is disposed between laminated sheets of PTFE. The tubular product 14 is cut to form a porous tube having an appropriate length.

It is possible to use virtually anything as a reinforcing material 13 if it can prevent the tubularly shaped sheet 9 from expanding in diameter. It is, however, preferable to use a film, tape or sheet of PTFE having its molecules oriented about the tube, or unsintered porous PTFE stretched at a greater ratio than the tube. If the reinforcing material 13 comprises PTFE having its molecules oriented about the tube, it permits formation of a stabilized tube according to this invention, since it prevents expansion of the tube diameter, enables the tube to be freely stretched, and can be fused with the PTFE of the tube. The reinforcing material comprising stretched porous PTFE has improved strength. If the reinforcing material 13 comprises PTFE, it can advantageously be left about the tube. If it comprises another substance, it may be removed if required, after the tubular product has been rolled to obtain a uniform wall thickness.

While the lubricant, which the sheet 1, FIG. 1 or 9, FIG. 7 contains can be removed at any time, it is preferable to remove it after the tubular product 5 or 14 has been rolled to obtain a uniform wall thickness, so that the rolling thereof, and the fusion of the reinforcing material with the tube may be effected smoothly and satisfactorily.

This method can also be used to form a tube containing a filler. The filler can be, for example, titanium dioxide, fluorinated graphite, graphite and carbon black and the like. The sheet 1 in FIG. 1 may, for example, be made by any of the following methods:

(1) An aqueous dispersion containing 15 to 95% by weight of a filler is mixed with a dispersion of PTFE, and the mixture is stirred in a coagulator or mixer so that the filler may be coagulated on the PTFE particles. Then, 20 to 200% by weight of a liquid lubricant is added into the mixture, and mixed carefully therewith, whereby a paste of PTFE is formed. The paste is formed into pellets, and these pellets are extrusion molded into a sheet.

(2) A fine PTFE powder and a filler are mixed uniformly by a rotary mixer to form a mixture containing 15 to 95% by weight of the filler. A liquid lubricant is added into the mixture, and mixed carefully therewith to form a paste of PTFE. The paste is formed into pellets, and these pellets are extrusion molded into a sheet.

(3) A mixture of a filler and a liquid lubricant is added into a fine PTFE powder in a twin-cylinder mixer, and mixed therewith carefully to form a paste of PTFE. The paste is formed into pellets, and these pellets are extrusion molded into a sheet.

If required, and particularly if the sheet contains a large quantity of the filler, the sheet is rolled in a desired direction so that it may obtain improved orientation, or be rendered porous to obtain improved strength.

The sheet 1, FIG. 1, is then processed in the same manner as for the unfilled tube previously described.

If it is desired to produce a porous PTFE tube having a higher degree of porosity, the tubular product 6, FIG. 6 is preheated at a temperature lower than 327° C., while the lubricant is removed therefrom, and the tubular product 6 is stretched longitudinally or circumferentially or both. In this case, the filler can only be present in the quantity of 15 to 70% by weight. Then, the tubular product is held in its stretched position, and heated at a temperature higher than 327° C., or preferably at 350° C., for about 20 minutes, so that the PTFE may not creep, but may yield a stabilized porous PTFE tube containing a filler.

In the porous PTFE tube of this invention, the porous PTFE is composed of fine nodes, and fine fibrils extending three-dimensionally among the nodes, and at least the nodes contain 15 to 95% by weight of the filler. The filler, thus, provide a high degree of activity in the tube. According to this invention, it is economically possible to manufacture a porous PTFE tube containing such a large quantity of filler, whether it may have a small and uniform wall thickness, or a small diameter and a uniform wall thickness, or a varying wall thickness.

While the invention has been described with reference to the preferred embodiments thereof, it is to be understood that modifications or variations may be easily made by anybody of ordinary skill in the art without departing from the scope of this invention which is defined by the appended claims.

What is claimed is:

1. The product produced by the process of:
(a) extruding a first sheet of unsintered PTFE containing lubricant by conventional techniques;
(b) wrapping said first sheet about a mandrel such that the extrusion or machine direction of said first sheet is oriented longitudinally to said mandrel, and the longitudinal edges of said first sheet overlap somewhat along the length of said mandrel;
(c) wrapping a second sheet of unsintered PTFE over said first sheet such that the machine direction of said second sheet is oriented circumferentially about said mandrel, thereby providing a reinforcing material for said first sheet;
(d) applying external pressure to said wrapped mandrel such as by rolling in order to provide a uniform wall thickness of the tube formed by said wrappings;
(e) removing said tube from said mandrel;
(f) heating said tube at a temperature below about 327° C. to remove said lubricant;
(g) stretching said tube in the direction of its longitudinal axis to a stretch ratio of about 1.4 to about 15:1; and
(h) heating said tube to a temperature higher than about 327° C. while holding it in its stretched state.

2. The product of claim 1 containing about 15 to about 95% by weight of a filler.

3. The product of claim 1 wherein said first sheet comprises a plurality of sheets of unsintered PTFE in laminar contact one upon the other.

4. A method of manufacturing a porous polytetrafluoroethylene (PTFE) tube, which comprises:

(a) extruding a first sheet of unsintered PTFE containing lubricant by conventional techniques;

(b) wrapping said first sheet about a mandrel such that the extrusion or machine direction of said first sheet is oriented longitudinally to said mandrel, and the longitudinal edges of said first sheet overlap somewhat along the length of said mandrel;

(c) wrapping a second sheet of unsintered PTFE over said first sheet such that the machine direction of said second sheet is oriented circumferentially about said mandrel, thereby providing a reinforcing material for said first sheet;

(d) applying external pressure to said wrapped mandrel such as by rolling in order to provide a uniform wall thickness of the tube formed by said wrappings;

(e) removing said tube from said mandrel;

(f) heating said tube at a temperature below about 327° C. to remove said lubricant;

(g) stretching said tube in the direction of its longitudinal axis to a stretch ratio of about 1.4 to about 15:1; and (h) heating said tube to a temperature higher than about 327° C. while holding it in its stretched state.

5. The method of claim 4 in which said first sheet is extruded and rolled to reduce its thickness.

6. The method of claim 4 wherein said first sheet comprises a plurality of sheets of unsintered PTFE in laminar contact one upon the other.

7. The method of claim 4 including removing said second sheet before the stretching step.

8. The method of claim 4 wherein said sheets contain about 15 to about 95% by weight of a filler.

9. The method of claim 8 wherein said filler is selected from the class consisting of titanium dioxide, fluorinated graphite, graphite and carbon black.

* * * * *